Patented Aug. 4, 1925.

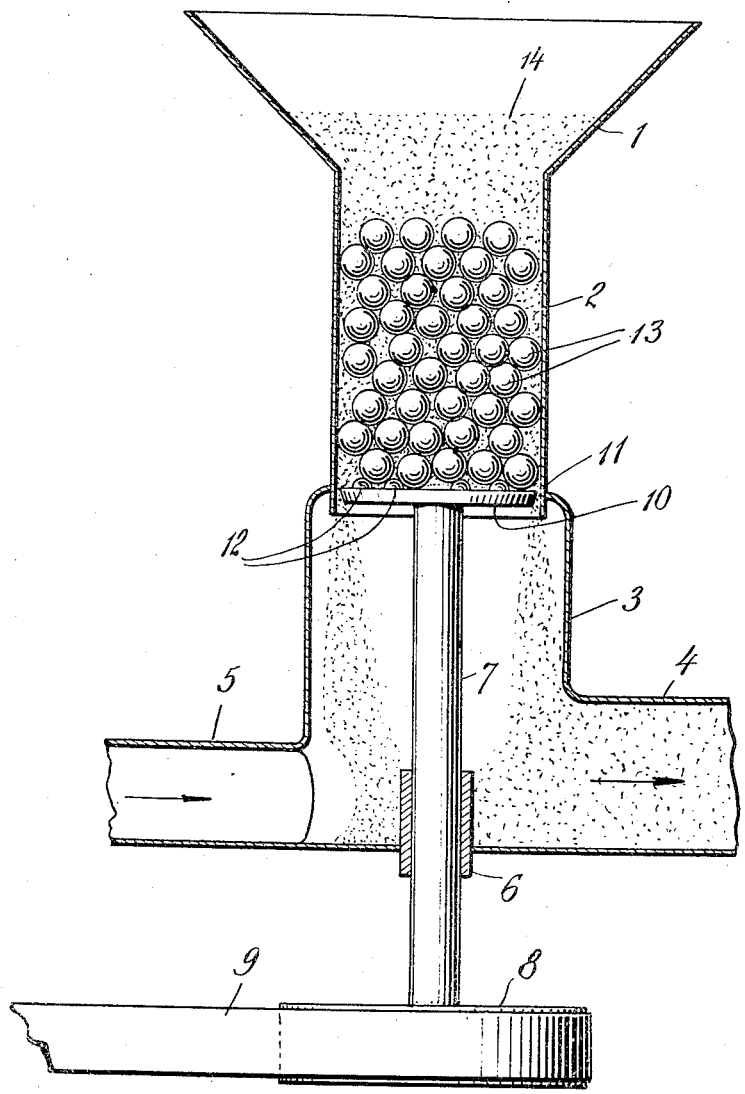

1,548,324

UNITED STATES PATENT OFFICE.

GUSTAV HENRY KAEMMERLING, OF ALLENTOWN, PENNSYLVANIA, ASSIGNOR TO FULLER-LEHIGH COMPANY, A CORPORATION OF PENNSYLVANIA.

FEEDER FOR PULVERIZED MATERIAL.

Application filed June 1, 1921. Serial No. 474,103.

*To all whom it may concern:*

Be it known that I, GUSTAV H. KAEMMERLING, residing at Allentown, in the county of Lehigh, State of Pennsylvania, have invented certain new and useful Improvements in Feeders for Pulverized Material; and I do hereby declare the following to be a full, clear, and exact description of the invention, such as will enable others skilled in the art to which it appertains to make and use the same.

The present invention relates to a device for feeding pulverized or finely divided material, such for example, as pulverized coal, and involves the provision of a device of this character having control means for producing a uniform flow of material, and for instantly shutting off the flow when so desired.

In the feeding device is a passage for the pulverized material, preferably downwardly extending, through which the material may flow by gravity as from a supply hopper to a conduit for conveying the material to the point where it is to be used. The flow of material through the passage is controlled by means consisting of a plurality of loosely packed bodies which are of a configuration and employed in such number that when they are at rest there will be no continuous path for the material from the top to the bottom of the packed bodies thus preventing the flow of material through the passage; but that when they are set in motion or agitated by appropriate means, the material will be permitted to flow past the balls along tortuous paths through the passage. Substantially spherical bodies are most effective for this purpose, and I have obtained the best results with steel balls.

Where the passage is downwardly extending as in the preferred form of construction, a support is provided near the discharge end of the passage for the balls loosely packed therein, and this support also carries the means for agitating the balls. The support for the balls preferably consists of a rotatable valve member situated near the discharge end of the passage for material, the surface of the valve member adjacent the balls being provided with projections for agitating the balls.

In the specific embodiment of the invention described hereinafter, the device has a shaft extending into the passage for material upon the end of which is mounted a disc-shaped valve member of slightly less diameter than the passage to provide an annular passage for the material between the valve member and the wall of the passage.

The invention is illustrated in the accompanying drawing in application, as an example, to a feeding device for pulverized coal, in which the figure illustrates in sectional elevation the feeding device connected to a conveyor conduit.

The device illustrated in the drawing has a hopper 1 positioned above a cylindrical passage 2. The passage 2 discharges into a receptacle 3 which is in open communication with a conveyor conduit 4, at one side of the receptacle, and a duct 5 for air under pressure opening into the other side. Mounted in a bearing 6 at the bottom of the receptacle 3 is a shaft 7 extending through the receptacle, and having a pulley 8 at its lower end connected by means of a belt 9 to power. At the upper end of the shaft 7 is a disc-shaped valve member 10 of slightly less diameter than the passage 2 to provide an annular passage 11 for the material between the wall of the passage 2 and the periphery of the valve member 10. The upper surface of the valve member 10 is provided with a series of projections 12 which are adapted to engage the lowermost balls of a plurality of balls 13 situated in the passage 2, and which are supported by the valve member 10.

The operation of the device is as follows:—

The pulverized or finely divided material such as coal 14 is conveyed by any suitable means to the hopper and discharged therein, the material dropping by gravity and filling up the spaces or pockets between the balls until its downward passage is blocked. As soon as the shaft 7 is rotated the projections 12 act on the lowermost of balls 13 causing them to move irregularly around the passage, and this motion is communicated to the upper balls causing them to continuously change their positions. The agitation of the balls 13 permits the material 14 to flow downwardly by gravity past the balls, out of the discharge end of the passage 2, through the annular passage 11 and into the receptacle 3. As the material falls through the receptacle and into the path of the blast of air from the air duct 5, it is entrained by the air and carried out through the conveyor conduit 4 which may, for example, lead to a pulverized fuel burner. When it is desired to shut off the flow of material the driving means are disconnected, thus stopping the rotation of the shaft 7 and the valve member 10, whereupon the balls 13 at once come to rest, and completely close the passage 2.

I have found that when the device is in operation the material flows through the passage and is discharged at an absolutely uniform rate for any given speed of rotation of the shaft 7, and that any lumps of foreign matter which may be present in the material are tumbled around among or over the balls without clogging the feeder. The rate of discharge of material being uniform for a given speed, the output of the feeder may be conveniently measured by means of a revolution counter attached to the shaft 7. In practice, for a passage 4″ in diameter, ½″ balls have given satisfactory results, and ⅜″ balls have been successfully used in passages having smaller diameters such as 2″ and 3″. The balls in passage 2 are usually made about 3″ in depth so as to provide a sufficient number of balls to instantly cut off the flow of material when the operation of the feeder is stopped.

I claim:

1. A device for feeding pulverized or finely divided material, having a passageway through which the material is to be fed, a loosely packed mass of freely movable bodies in the passageway, an element in the passageway in contact with the freely movable bodies, a second element in contact with said freely movable bodies, one of the elements being adapted to be moved relative to the other and cooperating therewith to agitate the freely movable bodies, said freely movable bodies being constructed and arranged to permit the flow of material when agitated by said cooperating elements and to shut off the flow when at rest.

2. A device for feeding pulverized or finely divided material, having a passageway through which the material is to be fed, a loosely packed mass of freely movable bodies in the passageway, and means within the passageway adapted to be moved relatively to the walls thereof for causing an agitation of the freely movable bodies, said freely movable bodies being constructed and arranged to permit the flow of material through the passageway when set in motion by said agitating means, and to shut off the flow when at rest.

3. In a device for feeding pulverized or finely divided material having a downwardly extending passageway through which the material is to be fed, the combination of a rotatable disc in said passageway peripherally spaced from the walls thereof to provide an outlet for the material, and a loosely packed mass of freely movable bodies supported on said disc in a plurality of irregular layers.

4. A device for feeding pulverized or finely divided material having a downwardly extending passageway through which the material is to be fed, a loosely packed mass of freely movable bodies in said passageway normally closing the latter, a rotatable valve member situated near the discharge end of said passageway upon which said freely movable bodies are supported, and means upon said rotatable valve member for agitating the said freely movable bodies, whereby when said valve member is rotated and the freely movable bodies acted upon by said agitating means, the material flows past the freely movable bodies, through said passageway and past the valve member.

5. A device for feeding pulverized or finely divided material having a downwardly extending passageway through which the material is to be fed, a loosely packed mass of freely movable bodies in said passageway normally closing the latter, a rotatable valve member in the passageway provided with a projection on its surface adjacent the freely movable bodies to agitate the latter, whereby when the freely movable bodies are acted upon by said projection, the material is permitted to flow past the freely movable bodies, through the passageway and past the valve member.

6. A device for feeding pulverized or finely divided material having a downwardly extending passageway through which the material is to be fed, a loosely packed mass of freely movable bodies in said passageway normally closing the latter, a shaft extending into said passageway, a disk-shaped valve member of slightly less diameter than said passageway mounted on the end of said shaft, upon which valve member the freely movable bodies are supported, said valve member having a projection on its surface adjacent the freely movable bodies for agitating the latter, and driving means for rotating said shaft and said valve member.

In testimony whereof I affix my signature.

GUSTAV HENRY KAEMMERLING.